(12) United States Patent
Buck et al.

(10) Patent No.: US 10,031,985 B2
(45) Date of Patent: Jul. 24, 2018

(54) SENSITIVITY CALCULATION FILTERING FOR STATISTICAL STATIC TIMING ANALYSIS OF AN INTEGRATED CIRCUIT

(71) Applicant: INTERNATIONAL BUSINESS MACHINES CORPORATION, Armonk, NY (US)

(72) Inventors: Nathan Buck, Underhill, VT (US); Eric A. Foreman, Fairfax, VT (US); Jeffrey G. Hemmett, St. George, VT (US); Kerim Kalafala, Rhinebeck, NY (US); Gregory M. Schaeffer, Poughkeepsie, NY (US); Stephen G. Shuma, Underhill, VT (US); Natesan Venkateswaran, Hopewell Junction, NY (US); Chandramouli Visweswariah, Croton-on-Hudson, NY (US); Vladimir Zolotov, Putnam Valley, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 14/991,039

(22) Filed: Jan. 8, 2016

(65) Prior Publication Data
US 2017/0199953 A1 Jul. 13, 2017

(51) Int. Cl.
*G06F 17/50* (2006.01)

(52) U.S. Cl.
CPC ...... *G06F 17/5031* (2013.01); *G06F 17/5059* (2013.01); *G06F 2217/78* (2013.01); *G06F 2217/84* (2013.01)

(58) Field of Classification Search
CPC ............. G06F 17/5031; G06F 17/5059; G06F 2217/84
(Continued)

(56) References Cited

U.S. PATENT DOCUMENTS

| 5,790,415 A * | 8/1998 | Pullela ................ G06F 17/5022 716/113 |
| 6,496,960 B1 * | 12/2002 | Kashyap ............. G06F 17/5036 703/2 |

(Continued)

FOREIGN PATENT DOCUMENTS

| WO | 2006009671 A2 | 1/2006 |
| WO | 2008106369 A3 | 9/2008 |

OTHER PUBLICATIONS

Agarwal et al., Circuit Optimization using Statistical Static Timing Analysis, DAC 2005, Jun. 13-17, 2005.
(Continued)

*Primary Examiner* — Paul Dinh
(74) *Attorney, Agent, or Firm* — Cantor Colburn LLP; Steven Meyers

(57) ABSTRACT

Examples of techniques for statistical static timing analysis of an integrated circuit are disclosed. In accordance with aspects of the present disclosure, a computer-implemented method for statistical static timing analysis of an integrated circuit is provided. The method may comprise identifying a timing parameter that contributes to a delay calculation. The method may further comprise determining, by a processing device, whether the identified timing parameter significantly impacts the delay calculation. The method may also comprise, responsive to determining that the identified timing parameter does not significantly impact the delay calculation, avoiding a sensitivity calculation for the identified timing parameter.

13 Claims, 3 Drawing Sheets

(58) Field of Classification Search
USPC .......................................................... 716/108
See application file for complete search history.

(56) References Cited

U.S. PATENT DOCUMENTS

| | | | | |
|---|---|---|---|---|
| 6,615,395 | B1* | 9/2003 | Hathaway | G06F 17/5031 |
| | | | | 716/113 |
| 7,458,049 | B1 | 11/2008 | Tuncer et al. | |
| 8,244,491 | B1* | 8/2012 | Zhang | G06F 17/5031 |
| | | | | 702/69 |
| 8,245,165 | B1* | 8/2012 | Tiwary | G06F 17/5031 |
| | | | | 716/108 |
| 8,302,046 | B1* | 10/2012 | Keller | G06F 17/5031 |
| | | | | 716/108 |
| 8,443,321 | B1 | 5/2013 | Fender et al. | |
| 8,543,954 | B1 | 9/2013 | Keller et al. | |
| 8,656,331 | B1* | 2/2014 | Sundareswaran | G06F 17/5036 |
| | | | | 716/113 |
| 8,813,006 | B1* | 8/2014 | Parameswaran | G06F 17/5031 |
| | | | | 716/100 |
| 9,501,609 | B1 | 11/2016 | Foreman et al. | |
| 9,519,747 | B1* | 12/2016 | Buck | G06F 17/5081 |
| 2005/0246116 | A1* | 11/2005 | Foreman | G01R 31/3016 |
| | | | | 702/69 |
| 2007/0006106 | A1* | 1/2007 | Bartling | G06F 17/505 |
| | | | | 716/113 |
| 2008/0209374 | A1 | 8/2008 | Buck et al. | |
| 2009/0265674 | A1 | 10/2009 | Buck et al. | |
| 2011/0055793 | A1 | 3/2011 | Buck et al. | |
| 2014/0149956 | A1 | 5/2014 | Fluhr et al. | |
| 2016/0085890 | A1* | 3/2016 | Allen | G06F 17/5036 |
| | | | | 703/13 |

OTHER PUBLICATIONS

Zolotov et al, "Timing Analysis With Nonseparable Statistical and Deterministic Variations", DAC 2012, Jun. 3-7, 2012.

* cited by examiner

SENSITIVITY CALCULATION FILTERING FOR STATISTICAL STATIC TIMING ANALYSIS OF AN INTEGRATED CIRCUIT

BACKGROUND

The present disclosure relates to techniques for integrated circuit design and fabrication and, more particularly, to techniques for performing sensitivity calculation filtering for statistical static timing analysis of an integrated circuit.

One form of performance analysis used during integrated circuit (IC) design is static timing analysis (STA). STA is an important process by which one identifies any circuit races/hazards which could cause a chip to malfunction, verifies the operational speed of a chip, and identifies the paths which limit the operational speed. STA typically operates on a timing graph, in which nodes represent electrical nodes (e.g., circuit pins) at which signals may make transitions at various times, and edges, or segments, representing the delays of the circuits and/or wires connecting the nodes. Although it may report performance-limiting paths, typical STA methods do not actually operate on paths (of which there may be an exponentially large number), and instead use a "block-based" approach to compute and propagate forward signal arrival times reflecting the earliest and/or latest possible times that signal transitions can occur at nodes in the timing graph. As a result, STA is efficient, allowing for rapid estimation of IC timing on very large designs as compared to other approaches (e.g., transient simulation).

SUMMARY

In accordance with aspects of the present disclosure, a computer-implemented method for statistical static timing analysis of an integrated circuit is provided. The method may comprise identifying a timing parameter that contributes to a delay calculation. The method may further comprise determining, by a processing device, whether the identified timing parameter significantly impacts the delay calculation. The method may also comprise, responsive to determining that the identified timing parameter does not significantly impact the delay calculation, avoiding a sensitivity calculation for the identified timing parameter.

In accordance with additional aspects of the present disclosure, a system for sensitivity calculation filtering for statistical static timing analysis of an integrated circuit is provided. The system may comprise a processor in communication with one or more types of memory. The processor may be configured to identify a timing parameter that contributes to a delay calculation. The processor may be further configured to determine whether the identified timing parameter significantly impacts the delay calculation. The processor may be also configured to responsive to determining that the identified timing parameter does not significantly impact the delay calculation, avoid a sensitivity calculation for the identified timing parameter.

In accordance with yet additional aspects of the present disclosure, a computer program product for sensitivity calculation filtering for statistical static timing analysis of an integrated circuit is provided. The computer program product may comprise a non-transitory storage medium readable by a processing circuit and storing instructions for execution by the processing circuit for performing a method. The method may comprise identifying a timing parameter that contributes to a delay calculation. The method may further comprise determining whether the identified timing param-eter significantly impacts the delay calculation. The method may also comprise, responsive to determining that the identified timing parameter does not significantly impact the delay calculation, avoiding a sensitivity calculation for the identified timing parameter.

BRIEF DESCRIPTION OF THE DRAWINGS

The subject matter which is regarded as the invention is particularly pointed out and distinctly claimed in the claims at the conclusion of the specification. The forgoing and other features, and advantages thereof, are apparent from the following detailed description taken in conjunction with the accompanying drawings in which:

DETAILED DESCRIPTION

Various implementations are described below by referring to several examples of sensitivity calculation filtering for statistical static timing analysis of an integrated circuit. During statistical static timing analysis (SSTA), the sensitivities of timing quantities are calculated to various sources of variation. This enables timing to be modeled parametrically over an N-dimensional process space. An example of a timing quantity is the delay experienced when a signal transitions through a digital circuit element (i.e., a "gate" such as an inverter). The delay is a metric reflecting how long it takes an input signal transition to propagate through the gate.

An example of a source of variation is the metal layer thickness variations in a wire that the gate is driving. These variations affect the load experienced by the gate, which then impacts the gate delay. The calculation of sensitivities is computationally expensive, and often the sensitivities calculated can be numerically insignificant (that is, the timing quantity may have a very low sensitivity to some source of variation, such that the variation may be ignored). Any computational effort spent calculating trivial sensitivities is effectively wasted, as these small sensitivities have little to no impact on the final timing outcome (and in practice the small sensitivities are actually ignored to better utilize processing system memory).

In some implementations, the techniques disclosed herein provide accurate, efficient corner metal modeling while avoiding trivial sensitivity calculations. In addition, the present techniques can maintain quality of results (QOR) while reducing runtime of the SSTA analysis. Moreover, the present techniques provide for variable accuracy to enable the use of more aggressive filtering to trade QOR for decreased runtime, which may be useful early in the IC design cycle or during optimization runs. In examples, significant runtime reductions can be achieved with appropriate filtering. These and other advantages will be apparent from the description that follows.

Figure 1:
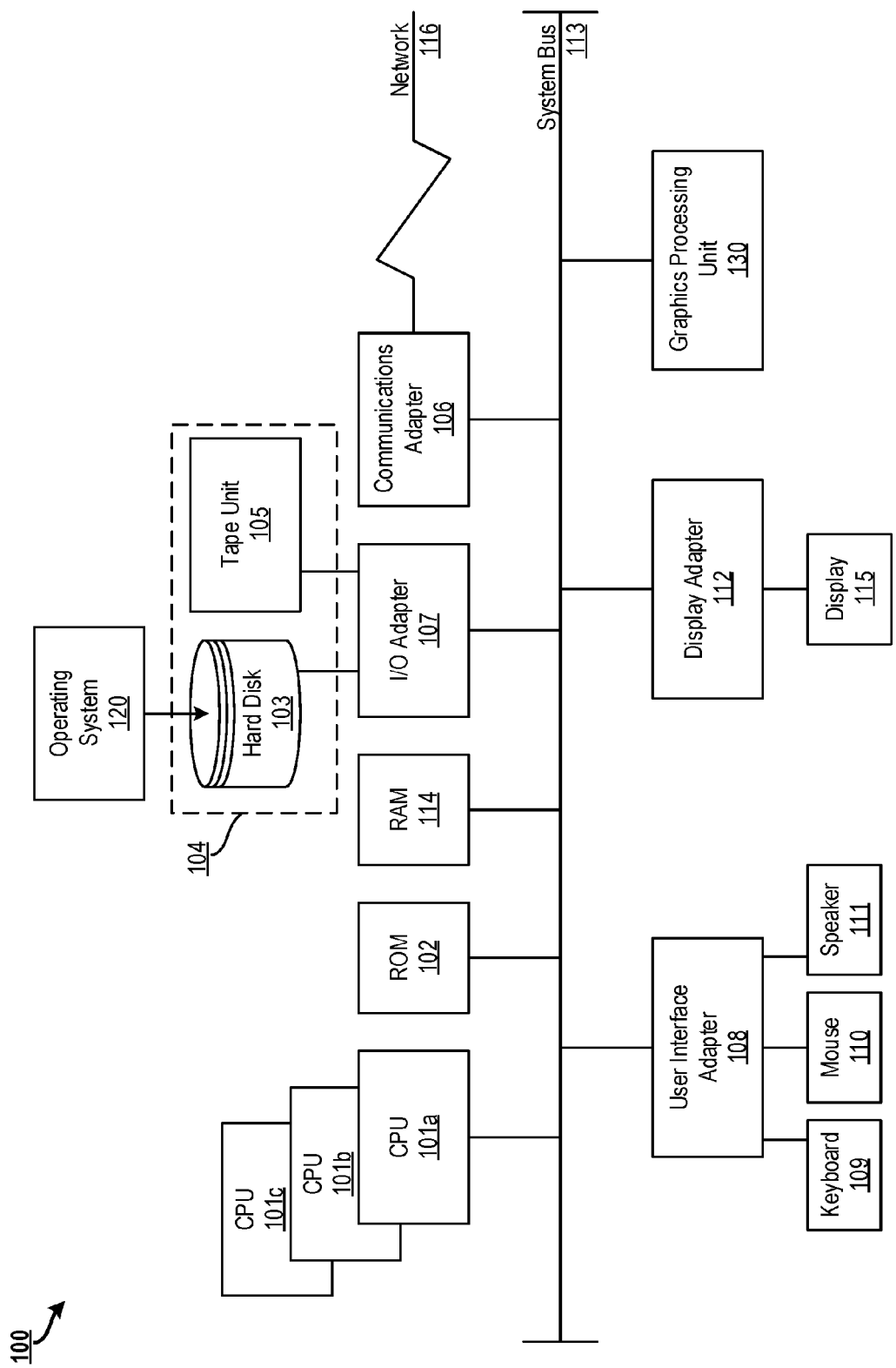
FIG. 1 illustrates a block diagram of a processing system for implementing the techniques described herein according to examples of the present disclosure.

FIG. 1 illustrates a block diagram of a processing system 100 for implementing the techniques described herein. In examples, the processing system 100 has one or more central processing units (processors) 101a, 101b, 101c, etc. (collectively or generically referred to as processor(s) 101). In aspects of the present disclosure, each processor 101 may include a reduced instruction set computer (RISC) microprocessor. Processors 101 are coupled to system memory (e.g., random access memory (RAM) 114 and various other components via a system bus 113. Read only memory (ROM) 102 is coupled to the system bus 113 and may include a basic input/output system (BIOS), which controls certain basic functions of the processing system 100.

FIG. 1 further illustrates an input/output (I/O) adapter 107 and a communications adapter 106 coupled to the system bus 113. I/O adapter 107 may be a small computer system interface (SCSI) adapter that communicates with a hard disk 103 and/or tape storage drive 105 or any other similar component. I/O adapter 107, hard disk 103, and tape storage device 105 are collectively referred to herein as mass storage 104. Operating system 120 for execution on the processing system 100 may be stored in mass storage 104. A network adapter 106 interconnects bus 113 with an outside network 116 enabling the processing system 100 to communicate with other such systems.

A screen (e.g., a display monitor) 115 is connected to system bus 113 by display adaptor 112, which may include a graphics adapter to improve the performance of graphics intensive applications and a video controller. In one aspect of the present disclosure, adapters 106, 107, and 112 may be connected to one or more I/O busses that are connected to system bus 113 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 113 via user interface adapter 108 and display adapter 112. A keyboard 109, mouse 110, and speaker 111 all interconnected to bus 113 via user interface adapter 108, which may include, for example, a Super I/O chip integrating multiple device adapters into a single integrated circuit.

In some aspects of the present disclosure, the processing system 100 includes a graphics processing unit 130. Graphics processing unit 130 is a specialized electronic circuit designed to manipulate and alter memory to accelerate the creation of images in a frame buffer intended for output to a display. In general, graphics processing unit 130 is very efficient at manipulating computer graphics and image processing, and has a highly parallel structure that makes it more effective than general-purpose CPUs for algorithms where processing of large blocks of data is done in parallel.

Thus, as configured in FIG. 1, the processing system 100 includes processing capability in the form of processors 101, storage capability including system memory 114 and mass storage 104, input means such as keyboard 109 and mouse 110, and output capability including speaker 111 and display 115. In some aspects of the present disclosure, a portion of system memory 114 and mass storage 104 collectively store an operating system such as the AIX® operating system from IBM Corporation to coordinate the functions of the various components shown in FIG. 1.

Figure 2:
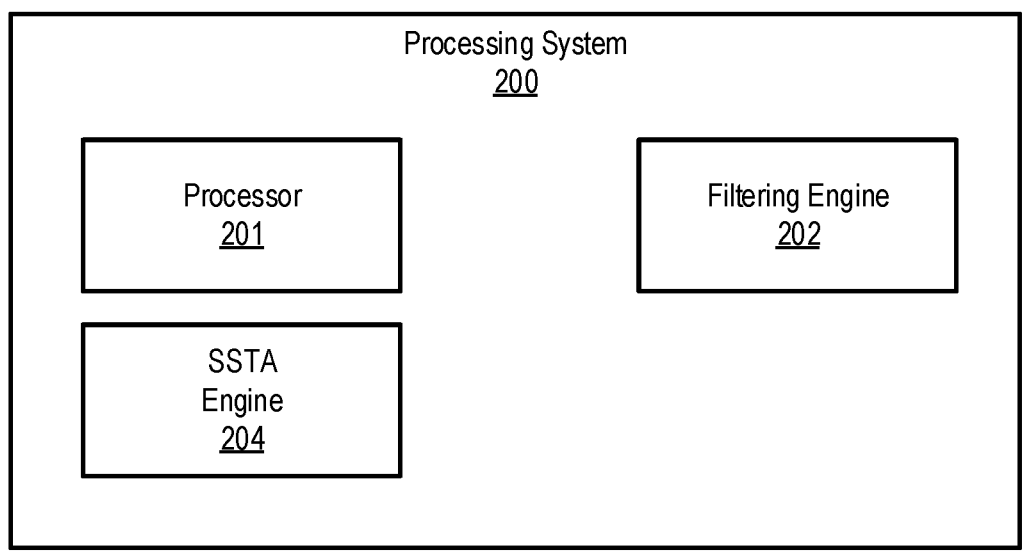
FIG. 2 illustrates a block diagram of a processing system for sensitivity calculation filtering for statistical static timing analysis of an integrated circuit according to examples of the present disclosure.

FIG. 2 illustrates a block diagram of a processing system 200 for sensitivity calculation filtering for statistical static timing analysis of an integrated circuit according to examples of the present disclosure. FIG. 2 illustrates a block diagram of a processing system 200 for statistical static timing analysis of an integrated circuit according to examples of the present disclosure. The various components, modules, engines, etc. described regarding FIG. 2 may be implemented as instructions stored on a computer-readable storage medium, as hardware modules, as special-purpose hardware (e.g., application specific hardware, application specific integrated circuits (ASICs), as embedded controllers, hardwired circuitry, etc.), or as some combination or combinations of these. In examples, the engine(s) described herein may be a combination of hardware and programming. The programming may be processor executable instructions stored on a tangible memory, and the hardware may include processors 101 for executing those instructions. Thus system memory 114 of FIG. 1 can be said to store program instructions that when executed by the processor 201 implements the engines described herein. Other engines may also be utilized to include other features and functionality described in other examples herein.

In the example of FIG. 2, the processing system 200 comprises a processor 201, a filtering engine 202, and a statistical static timing analysis (SSTA) engine 204. Alternatively or additionally, the processing system 200 may include dedicated hardware, such as one or more integrated circuits, Application Specific Integrated Circuits (ASICs), Application Specific Special Processors (ASSPs), Field Programmable Gate Arrays (FPGAs), or any combination of the foregoing examples of dedicated hardware, for performing the techniques described herein.

Filtering engine 202 enables trivial delay changes to be predicted and filtered out before a static statistical timing sensitivity analysis is performed. This enables the SSTA to be more efficient and to use less system resources (e.g., memory resources, processing resources, etc.). To perform the filtering, filtering engine 202 identifies a timing parameter that contributes to a delay calculation, determines whether the identified timing parameter significantly impacts the delay calculation, and, responsive to determining that the identified timing parameter does not significantly impact the delay calculation, avoiding a sensitivity calculation for the identified timing parameter.

Filtering with filtering engine 202 provides at least two stages where calculations may potentially be avoided: in cases of circuit load when processing driving gates, and in cases of circuit delay on the wire itself. Each of the load and delay can vary as functions of metal layers or loading pin caps.

SSTA engine 204 performs a statistical static timing analysis of an integrated circuit (i.e., an integrated circuit design) to create a parameterized model of the integrated circuit for a plurality of paths on the IC using a plurality of timing corners. SSTA engine 204 performs the SSTA using less system resources than would otherwise be utilized because of the filtered out trivial delay changes.

Figure 3:
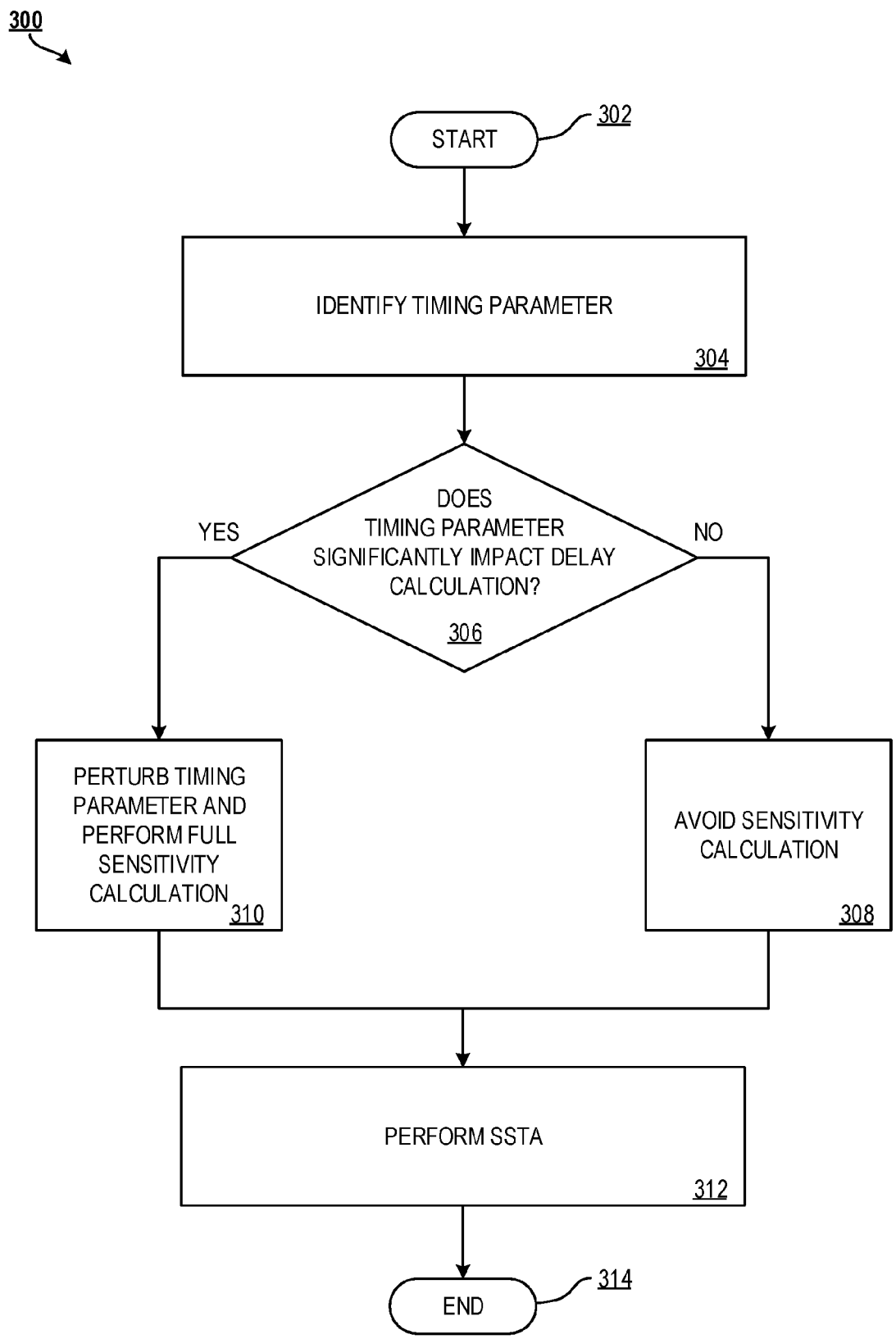
FIG. 3 illustrates a flow diagram of a method for sensitivity calculation filtering for statistical static timing analysis of an integrated circuit according to examples of the present disclosure according to examples of the present disclosure.

FIG. 3 illustrates a flow diagram of a method 300 for sensitivity calculation filtering for statistical static timing analysis of an integrated circuit according to examples of the present disclosure. The method 300 starts at block 302 and continues to block 304.

At block 304, the method 300 includes identifying a timing parameter that contributes to a delay calculation. Examples of timing parameters include temperature, voltage, process, and the like. The timing parameter may be selected automatically or manually, such as by a user. In examples, automatic selection of the timing parameter may be performed using instance specific data to predict trivial calculations. Some examples of instance specific data include R/C data (SPICE), wire geometry data, and deterministic delay data, among others.

At block 306, the method 300 includes determining whether the timing parameter significantly impacts the delay calculation. The determination may include comparing the delay calculation to a threshold or percentage change to determine whether the timing parameter significantly impacts the delay calculation. Minor changes are not significant impacts while major changes are significant impacts.

There exist multiple sources of data that may be measured to predict the level of delay impact, and may include at least one of geometry information, electrical (R/C) information, Reduced Order Model information, and base corner (or deterministic) timing data.

The geometry information may include the total distance a given net travels on specific metal layers. If, for example, the total distance travelled on a given layer is less than a user defined threshold (on an absolute and or percentage basis), then perturbing that metal layer drives a trivial change in load and/or wire delay, as this layer does not contribute significantly to the load or wire delay in the first place. In this example, eliminating the R/C contribution of that layer does not have a significant impact on the load or wire delay.

The electrical information may include consideration of at least one of individual R/C information and lumped R/C data. For example, if perturbing a given metal layer results in a change in R/C data that is less than a user defined threshold (on an absolute and or percentage basis), then this perturbation results in a negligible change in delay. Similarly, if the pincaps being varied in a perturbation vary less than some a defined threshold (on an absolute and or percentage basis), then this perturbation results in a negligible change in delay and may be ignored.

Similar pre/post perturbation analysis may also occur on the Reduced Order Models so that the actual R/C data is reduced to for timing analysis (e.g., Pi models, Pole/Residue information). Although this can utilize more computational resources than geometric or raw R/C analysis, it may provide an additional level of filtering for cases where the geometry or R/C analysis is indeterminate.

The base corner or deterministic timing data may also be used to control filtering. In examples, this data is obtained from the pre-perturbation base corner timing values. In this example, if the base corner wire delay value is sufficiently small in magnitude, and/or if the base corner slews show sufficiently small variation over the timing arc, it may be assumed that any variability on the arc is also small in magnitude, assuming that the timing run setup attempts to ensure the base corner values do not represent extreme minimum values. Given an appropriate setup, if some combination of the base corner data is less than some user defined thresholds, processing some or all of the parameter perturbations may be ignored. For example, if a base corner wire delay is deemed sufficiently small, sensitivity analysis on that arc may be avoided. Alternatively, if the delay of a wire driven by a gate element is sufficiently small, and/or its change in base corner slew over the wire is sufficiently small, perturbation of metal parameters on the driving book may be avoided.

In the above examples, the threshold values are arbitrary and may be user defined. This allows for variable accuracy in the timing analysis, where the filtering thresholds may be used to provide a balance between runtime performance and accuracy of results. Typically using larger acceptable thresholds may result in increased filtering at reduced accuracy, as compared to no filtering, while using smaller thresholds improves accuracy while incurring increased runtime. For example, early in the design cycle when much of the data is approximate, larger thresholds could be used to improve turn-around time, and these thresholds could then be reduced as the design quality increases to provide better accuracy.

In aspects of the present disclosure, preprocessing prior to the determining at block 306 may include pre-processing the timing parameter for calculation filtering by R/C, geometry, etc.

At block 308, if it determined that the timing parameter does not significantly impact the delay calculation, the method 300 includes avoiding a sensitivity calculation for the identified timing parameter. In this way, the method 300 avoids unnecessary sensitivity calculations and saves processing system resources (i.e., processing resources, memory resources, etc.). In examples, avoiding the sensitivity calculation may include skipping the identified timing parameter altogether. In other examples, avoiding the sensitivity calculation may include applying a nominal bounding value to the timing parameter. In yet other examples, avoiding the sensitivity calculation may include applying a fast approximation (e.g., an Elmore delay based sensitivity technique) for the sensitivity value for the timing parameter. Avoiding the sensitivity calculation occurs instead of perturbing the timing parameter and performing a full sensitivity calculation for the timing parameter (block 310) when the timing parameter does not significantly impact the delay calculation.

However, at block 310, if it is determined that the timing parameter does significantly impact the delay calculation, the timing parameter is perturbed and a full sensitive calculation is performed. In examples, a full sensitivity calculation may be a finite difference calculation.

At block 312, the method 300 includes performing a static statistical timing analysis. In examples in which the identified timing parameter does not significantly impact the delay calculation and the sensitivity calculation for that timing parameter is avoided (block 308), the SSTA is performed without the sensitivity calculation for that timing parameter, thereby increasing the efficiency of the SSTA while decreasing processing and memory resources used during the SSTA. The method 300 continues to block 314 and ends.

Additional processes also may be included, and it should be understood that the processes depicted in FIG. 3 represent illustrations, and that other processes may be added or existing processes may be removed, modified, or rearranged without departing from the scope and spirit of the present disclosure.

The present techniques may be implemented as a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD- ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some examples, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to aspects of the present disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various aspects of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method for sensitivity calculation filtering for statistical static timing analysis of an integrated circuit, the method comprising:

identifying a timing parameter that contributes to a delay calculation;

determining, by a processing device, whether the identified timing parameter significantly impacts the delay calculation based at least in part on geometry information, the geometry information comprising a total distance a given net travels on a specific metal layer;

responsive to determining that the identified timing parameter does not significantly impact the delay calculation, avoiding a sensitivity calculation for the identified timing parameter, wherein avoiding the sensitivity calculation occurs instead of perturbing the timing parameter and performing a full sensitivity calculation for the timing parameter; and responsive to determining that the identified timing parameter does significantly impact the delay calculation, perturbing the timing parameter and performing a full sensitivity calculation for the timing parameter, wherein the identified timing parameter does not significantly impact the delay calculation is implemented in the integrated circuit and provided to a fabrication facility for manufacturing the integrated circuit.

2. The computer-implemented method of claim 1, wherein avoiding a sensitivity calculation for the identified timing parameter comprises at least one of skipping the timing parameter, applying a nominal bounding value, and applying a fast approximation.

3. The computer-implemented method of claim 1, wherein determining whether the identified timing parameter significantly impacts the delay calculation is based at least in part on electrical R/C information comprising at least one of individual R/C information and lumped R/C information.

4. The computer-implemented method of claim 1, wherein determining whether the identified timing parameter significantly impacts the delay calculation is based at least in part on reduced order model information.

5. The computer-implemented method of claim 1, wherein determining whether the identified timing parameter significantly impacts the delay calculation is based at least in part deterministic timing data.

6. The computer-implemented method of claim 1, wherein avoiding the sensitivity calculation occurs instead of ignoring the identified timing parameter.

7. A system for sensitivity calculation filtering for statistical static timing analysis of an integrated circuit, the system comprising:
   a processor in communication with one or more types of memory, the processor configured to:
      identify a timing parameter that contributes to a delay calculation,
      determine whether the identified timing parameter significantly impacts the delay calculation based at least in part on geometry information, the geometry information comprising a total distance a given net travels on a specific metal layer,
      responsive to determining that the identified timing parameter does not significantly impact the delay calculation, avoid a sensitivity calculation for the identified timing parameter, wherein avoiding the sensitivity calculation occurs instead of perturbing the timing parameter and performing a full sensitivity calculation for the timing parameter,
      responsive to determining that the identified timing parameter does significantly impact the delay calculation, perturb the timing parameter and perform a full sensitivity calculation for the timing parameter, and
      wherein the identified timing parameter does not significantly impact the delay calculation is implemented in the integrated circuit and provided to a fabrication facility for manufacturing the integrated circuit.

8. The system of claim 7, wherein avoiding a sensitivity calculation for the identified timing parameter comprises at least one of skipping the timing parameter, applying a nominal bounding value, and applying a fast approximation.

9. The computer-implemented method of claim 7, wherein determining whether the identified timing parameter significantly impacts the delay calculation is based at least in part on electrical R/C information comprising at least one of individual R/C information and lumped R/C information.

10. The computer-implemented method of claim 7, wherein determining whether the identified timing parameter significantly impacts the delay calculation is based at least in part on reduced order model information.

11. The computer-implemented method of claim 7, wherein determining whether the identified timing parameter significantly impacts the delay calculation is based at least in part deterministic timing data.

12. The computer-implemented method of claim 7, wherein avoiding the sensitivity calculation occurs instead of ignoring the identified timing parameter.

13. A computer program product for sensitivity calculation filtering for statistical static timing analysis of an integrated circuit, the computer program product comprising:
   a non-transitory storage medium readable by a processing circuit and storing instructions for execution by the processing circuit for performing a method comprising:
      identifying a timing parameter that contributes to a delay calculation,
      determining whether the identified timing parameter significantly impacts the delay calculation based at least in part on geometry information, the geometry information comprising a total distance a given net travels on a specific metal layer,
      responsive to determining that the identified timing parameter does not significantly impact the delay calculation, avoiding a sensitivity calculation for the identified timing parameter, wherein avoiding the sensitivity calculation occurs instead of perturbing the timing parameter and performing a full sensitivity calculation for the timing parameter,
      responsive to determining that the identified timing parameter does significantly impact the delay calculation, perturbing the timing parameter and performing a full sensitivity calculation for the timing parameter, and
      wherein the identified timing parameter does not significantly impact the delay calculation is implemented in the integrated circuit and provided to a fabrication facility for manufacturing the integrated circuit.

* * * * *